United States Patent [19]

Sawayama et al.

[11] Patent Number: 4,926,085
[45] Date of Patent: May 15, 1990

[54] VIBRATION WAVE MOTOR

[75] Inventors: Ippei Sawayama, Machida; Masayuki Jinnai, Utsunomiya, both of Japan

[73] Assignee: Canon Kabushiki Kaisha, Tokyo, Japan

[21] Appl. No.: 346,657

[22] Filed: May 3, 1989

[30] Foreign Application Priority Data

May 6, 1988 [JP] Japan ................ 63-109967

[51] Int. Cl.$^5$ ............................................. H01L 41/08
[52] U.S. Cl. .................................................. 310/323
[58] Field of Search ............................... 310/323, 328

[56] References Cited

U.S. PATENT DOCUMENTS

| | | | |
|---|---|---|---|
| 4,495,432 | 1/1985 | Katsuma | 310/328 |
| 4,513,219 | 4/1985 | Katsuma | 310/328 |
| 4,779,018 | 10/1988 | Okuno et al. | 310/323 |

*Primary Examiner*—Mark O. Budd
*Attorney, Agent, or Firm*—Fitzpatrick, Cella, Harper & Scinto

[57] ABSTRACT

A vibration wave motor which produces a relative movement between a vibrator and a member which is in contact with the vibrator via friction surfaces by means of a traveling vibration wave produced in the vibrator. In the motor, a friction surface of either one of the vibrator and frictional member is made of a material subjected to a hard alumite processing, and at least a friction surface of another one of the vibrator and frictional member is made of an ultrahard material consisting of a nickel-phosphorus-base alloy which contains at least one kind of material selected from the group consisting of silicon carbide, boron carbide, titanium boride and boron nitride.

18 Claims, 2 Drawing Sheets

VIBRATION WAVE MOTOR

BACKGROUND OF THE INVENTION

1. Field of the Invention

This invention relates to a vibration wave motor which is driven by a traveling vibration wave.

2. Description of the Related Art

FIG. 1 shows a schematic diagram of a vibration wave motor (also termed an ultrasonic motor) which is driven by a traveling vibration wave, such a motor, which has recently seen widespread use, is described, for example, in U.S. Pat. Nos. 4,495,432, 4,513,219 and 4,779,018. In FIG. 1, a piezoelectric element 1 is used as an electromechanical energy conversion element, and made of, for example, PZT (lead zirconium titanate). A ring-like vibrator 2 is made of an elastic material, and many piezoelectric elements 1 are adhered to one surface of the vibrator 2. The vibrator 2 is held by a stator (not illustrated) together with the piezoelectric elements 1. A movable body 3 having an almost identical shape as that of the vibrator 2 is contacted to the vibrator 2 by means of pressure, and forms a rotor. The piezoelectric elements 1 are divided into two groups, one of which is disposed at a pitch shifted by $\frac{1}{4}$ of the wavelength $\lambda$ of a vibration wave relative to another group. Each piezoelectric element within each group is disposed at a pitch corresponding to $\frac{1}{2}$ of the wavelength, and so that polarities of adjacent elements are reversed relative to each other.

In a vibration wave motor having such a configuration, when a voltage is applied to the piezoelectric element 1 in the direction of its thickness (the direction of its polarization) by an AC power supply 9 as shown in FIG. 2, the piezoelectric element 1 expands and contracts in a direction perpendicular to the direction of the voltage application.

Suppose that an AC voltage applied to one group of the piezoelectric elements 1 is $V_0 \sin \omega T$, and an Ac voltage applied to another group of the piezoelectric elements 1 is $V_0 \cos \omega T$, where T is time and $\omega = 2\pi/\lambda$.

Since polarities of adjacent piezoelectric elements are reversed relative to each other and the AC voltages, which are shifted in phase by 90° relative to each other, are applied to the two groups, respectively, the vibrator 2 produces a bending vibration in accordance with the pitch at which the piezoelectric elements 1 are disposed due to the expansion and contraction of the piezoelectric elements 1. That is, due to the relationship of the piezoelectric groups and the driving force on the group, when one group of piezoelectric elements of the vibrator 2 protrudes, the other group of piezoelectric elements retracts. Furthermore, since one group of the piezoelectric elements is displaced by $\frac{1}{4}$ of the wavelength relative to the other group as described above, the bending vibration so produced advances as a function of time.

Consequently, vibration is successively excited while the AC voltage is applied, and is transmitted through the vibrator 2 as a traveling bending vibration wave.

FIGS. 3(a), 3(b), 3(c) and 3(d) indicate the relationship between the traveling states of the wave and the movable body 3.

Suppose that the above-described traveling bending vibration wave proceeds in the direction of the arrow $X_1$. If the line O—O in FIG. 3 is assumed to be the central plane (neutral plane) of the vibrator 2 at a stationary state, the vibrator 2 deforms into the state indicated by the chain lines 6 in a vibrating state, and bending stresses at the the chain line (neutral plane) 6 in the vibrating state balance each other.

Relative to a cross sectional plane $7_1$ which is perpendicular to the neutral plane 6, the line of intersection $5_1$ (into the page) of these two planes is on the neutral plane 6 in variations in FIGS. 3(a) through 3(d). Hence, no stress is applied at the line of intersection $5_1$, which is only vibrating upwardly and downwardly.

On the other hand, the cross sectional plane $7_1$ performs a double-ended pendulum vibration to the right and left centering around the line of intersection $5_1$ (cross sections $7_2$ and $7_3$ also perform pendulum vibrations to the right and left centering around the lines of intersections $5_2$ and $5_3$, respectively).

Now, operation of the motor will be sequentially explained.

In the state shown in FIG. 3(a), a point $P_1$ on the line of intersection between the cross section $7_1$ and the surface of the vibrator 2 at the side of the moving body 3 is at the right-most position of a right and left vibration, and only has a movement component in the upper direction. That is, in this pendulum vibration, a movement component in the left direction (a direction reverse to the proceeding direction $X_1$ of the wave) is added when the line of intersection $5_1$ is at the positive side of the wave (at the side over the central plane 0—0), and a movement component in the right direction is added when the line of intersection $5_1$ is at the negative side of the wave (at the side under the central plane 0—0). The situation is the same for the lines of intersection $5_2$ and $5_3$. Namely, when the line of intersection $5_2$ and the cross section $7_2$ are in the former state as shown in FIG. 3(a), a movement component in the direction of the arrow (adjacent point $P_2$) is added to a point $P_2$. When the wave proceeds, and the line of intersection $5_1$ moves into the positive side of the wave as shown in FIG. 3(b), the point $P_1$ moves to the left as well as in the upper direction. In FIG. 3(c), the point $P_1$ only moves in the left at the upper dead center of the vertical vibration. In FIG. 3(d), the point $P_1$ moves to the left and downward directions. The wave further proceeds, and returns to the initial state in FIG. 3(a) after a movement in the right and downward directions and a movement in the right and upward directions. Thus, the point $P_1$ performs a spheroidal movement which synthesizes a series of movements as described above.

The movable body 3 is contacted to the vibrator 2 which performs such a spheroidal movement by means of pressure as described above. Considering the relationship between, for example, the movable body 3 and the point $P_1$ on the vibrator 2 as shown in FIG. 3(c), it can be understood by the above explanation that the spheroidal movement frictionally drives the movable body 3 in the direction of $X_2$. The points $P_2$ and $P_3$ and all other points on the vibrator 2 also frictionally drive the movable body 3 in the same manner as the point $P_1$ does.

As described above, the vibration wave motor is essentially a motor which is driven by friction. Accordingly, the driving force of the vibration wave motor largely depends on the product $\mu W$ of a pressure W for contacting the movable body 3 to the vibrator 2 by means of pressure and a coefficient of friction $\mu$ between the movable body 3 and the vibrator 2. Consequently, it will be observed that the driving force is increased by increasing, for example, the pressure W.

However, if the pressure W is too much increased, the bending vibration is suppressed, instead causing a decrease in the driving force. The movable body 3 may also be deformed due to the pressure and fall into a valley of the vibration wave. Points on vibrator 2 in a valley of the bending vibration wave move in a direction opposite to the apex of the vibration wave, as can be understood from FIG. 3. Hence, the driving force is largely reduced when movable body 3 is deformed into a valley. Accordingly, relative to the friction driving of the vibration wave motor, it is not recommended to increase the pressure W too much, and it is instead necessary to combine materials having large coefficients of friction $\mu$ in order to increase the driving force.

In general, however, the friction between materials having large coefficients of friction $\mu$ becomes very large. Hence, there is the disadvantage that the life of the vibration wave motor becomes extremely short when materials of such a combination are used in the vibration wave motor.

SUMMARY OF THE INVENTION

It is an object of the present invention to provide a vibration wave motor which has a large driving force, an excellent durability and a long life by means of forming the above-described contact portions with surfaces having large friction forces.

The features of a vibration wave motor according to the present invention which is fabricated in order to achieve such objectives will be explained utilizing the configuration shown in FIG. 1. The present invention is characterized in that a friction surface of either one of a movable body and a vibrator is made of a material subjected to a hard alumite processing, and the entire body or a friction surface of another one of the movable body and the vibrator is made of an ultrahard material consisting of a nickel-phosphorus-base alloy which contains at least one kind of material selected from the group consisting of silicon carbide (SiC), boron carbide ($B_4C$), titanium boride ($TiB_2$) and boron nitride (BN), in the form of a layer or a film.

In the above-described configuration, when the ultrahard material is deposited in the form of a film (a layer) limited only to the friction surface of the movable body or the vibrator (the contact surface with the movable body), it is preferable to configure the matrix body of the vibrator by a metal which propagates elastic waves easily, such as brass and iron alloys (for example, SUS, invar materials and the like).

In the present invention, as the material subjected to a hard alumite processing which constitutes the movable body (or the vibrator), aluminum or an aluminum alloy (for example, 5056 material, 5052 material, 2218 material and the like) which is alumite-processed by means of anodic oxidation so that the hardness becomes in the range not less than the semi-hard film (250–350 Hv (Vickers Hardness)), more preferably in the range not less than the hard film (350 Hv).

In the present invention, the above-described silicon carbide and the like contained in the ultrahard material which constitutes the vibrator or the movable body may preferably be within the range of 2–20 vol %. The content not more than 2 vol % causes a problem in durability, and the content not less than 21 vol % causes the problems that the deposition becomes difficult and the like. These nickel-phosphorus (Ni-P)-base alloys containing silicon carbide and the like may be formed on the surface of a matrix metal, for example, as a plated eutectoid film by means of an electroless plating in which silicon carbide and the like are dispersed in a plating bath. They may also contain components as small as 0–2%, such as Al, As, B, Bi, C, Cd, Co, Cr, Cu, Fe, H, Mn, Mo, N, Nb, Hb, S, Sb, Se, Si, Sn, V, Zn and the like.

Ni and P components may normally be 82–98% and 2–15%, respectively.

In order to form an ultrahard material on the friction surface of the vibrator in the form of a film, the above-described chemical nickel plating may, for example, be performed. In this case, a heat treatment at 300°–400° C. is performed after the formation of the film.

Due to the heat treatment, the hardness of the Ni-P film becomes high, and the coefficient of friction and durability also becomes satisfactory.

DESCRIPTION OF THE PREFERRED EMBODIMENTS

Embodiments of the present invention will be hereinafter described in detail. Since the mechanical structure of a vibration wave motor according to the present invention may be configured in the same manner as that of the well-known one (for example, the previously mentioned U.S. Patents), the above-described FIGS. 1 through 3 will be quoted, and an explanation will be omitted. Materials for the vibrator 2 and the movable body 3 of the vibration wave motor and combinations of these materials will now be described in detail.

Before explaining combinations of materials used for the vibrator 2 (see FIG. 1) and materials used for the movable 3 (see FIG. 1), an example of friction test of ultrahard materials and materials subjected to hard alumite processings specifically used in the present invention will be explained. In the friction test in the present invention, circular test pieces having an average radius of 22 mm were prepared. These test pieces were rotated while making contact by means of a pressure. Coefficients of friction $\mu$ were calculated from friction torques measured by a load meter and the applied pressure. The amount of abrasion was obtained from a change in the mass of a test piece before and after the friction test.

The tests were performed at a number of rotation of 350 rpm and an applied pressure of 2.75 kg for 18 minutes.

Figure 1:
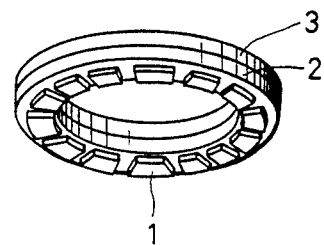
FIG. 1 is a schematic diagram of a principal portion of a vibration wave motor according to the present invention.
Figure 2:
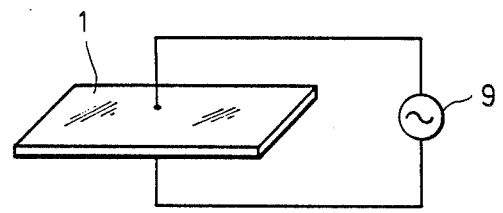
FIGS. 2 and 3(a) through 3(d) are diagrams for explaining the driving principle of the vibration wave motor.
Figure 3A:
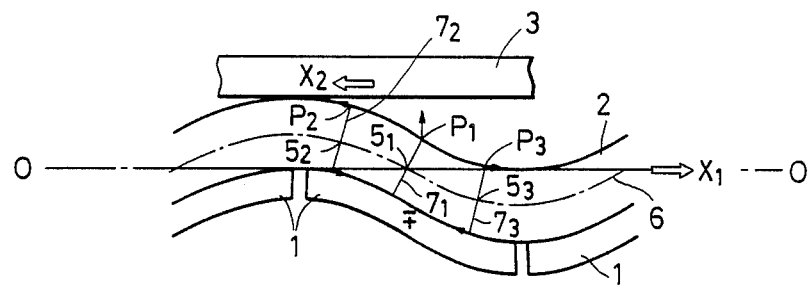
Figure 3B:
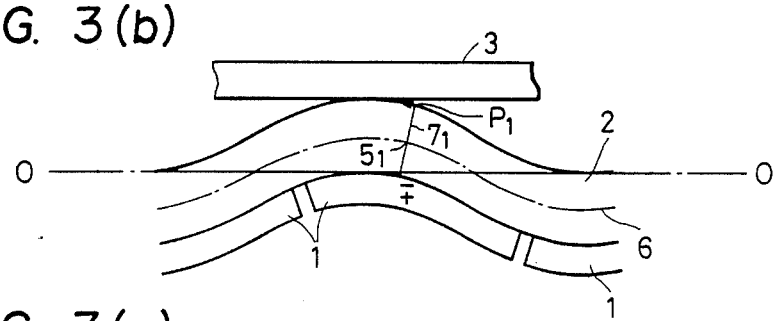
Figure 3C:
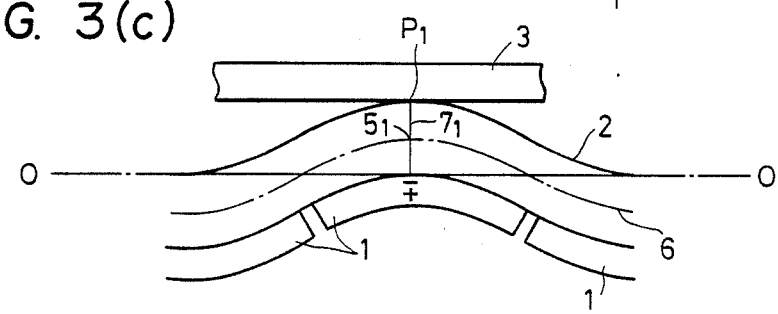
Figure 3D:
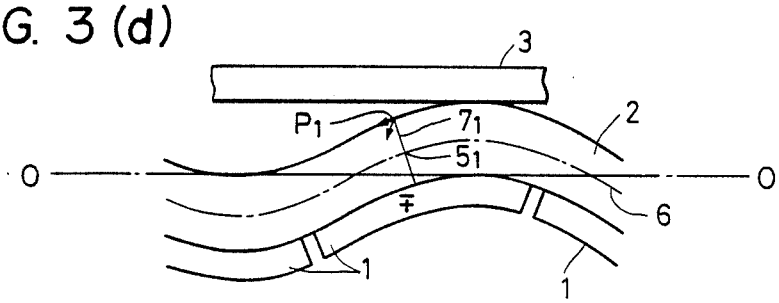

The movable body 3 and the vibrator 2 of the vibration wave motor shown in FIG. 1 were made of materials shown in the following Table 1, respectively, and friction tests were performed. Abbreviations in Table 1 are as follows.

Bs: carbon steel
CH: hard chrome
Ni-P: chemical nickel plating
CH processing: hard chrome processing
Ni-P-SiC (20%) AN: chemical nickel plating film containing 20 (vol) % silicon carbide annealed at 400° C.
Ni-P-SiC (15%) AN: chemical nickel plating film containing 15 (vol) % silicon carbide annealed at 400° C.
Ni-P-SiC (2%) AN: chemical nickel plating film containing 2 (vol) % silicon carbide annealed at 400° C.

Ni-P-SiC (1%) AN: chemical nickel plating film containing 1 (vol) % silicon carbide annealed at 400° C.

Ni-P-SiC (20%): chemical nickel plating film containing 20 (vol) % silicon carbide Ni-P-B$_4$C (20%) AN: chemical nickel plating film containing 20 (vol) % boron carbide annealed at 400° C.

Ni-P-B$_4$C (2%) AN: chemical nickel plating film containing 2 (vol) % boron carbide annealed at 400° C.

Ni-P-TiB$_2$ (20%) AN: chemical nickel plating film containing 20 (vol) % titanium boride annealed at 400° C.

Ni-P-TiB$_2$ (2%) AN: chemical nickel plating film containing 2 (vol) % titanium boride annealed at 400° C.

Ni-P-BN (20%) AN: chemical nickel plating film containing 20 (vol) % boron nitride annealed at 400° C.

Ni-P-BN (2%) AN: chemical nickel plating film containing 2 (vol) % boron nitride annealed at 400° C.

TABLE 1

| Movable body | Vibrator | | | | | | | |
|---|---|---|---|---|---|---|---|---|
| | Bs + CH | Alumina | Al/Hard alumite | Ni—P—SiC (2%) AN | Ni—P—SiC (15% AN) | Ni—P—SiC (20% AN) | Ni—P—SiC (20%) | Ni—P—SiC (1%) AN |
| Rubber-system brake material | ○ | △ | △ | △ | △ | △ | △ | △ |
| Al/Hard alumite | X | ○ | X | ⊚ | ⊚ | ⊚ | ○ | ○ |
| S48C | X | X | △ | △ | △ | △ | △ | △ |
| Ni—P | △ | △ | △ | △ | △ | △ | △ | △ |
| S48C (CH Processed) | X | △ | △ | △ | △ | △ | △ | △ |
| Alumina | X | X | △ | △ | △ | △ | △ | △ |
| Al | X | X | X | X | X | X | X | X |

| Movable body | Vibrator | | | | | | |
|---|---|---|---|---|---|---|---|
| | Bs | Ni—P—B$_4$C (20%) AN | Ni—P—B$_4$C (2%) AN | Ni—P—TiB$_2$ (20%) AN | Ni—P—TiB$_2$ (2%) AN | Ni—P—BN (20%) AN | Ni—P—BN (2%) AN |
| Rubber-system brake material | △ | △ | △ | △ | △ | △ | △ |
| Al/Hard alumite | △ | ⊚ | ⊚ | ⊚ | ⊚ | ⊚ | ⊚ |
| S48C | △ | △ | △ | △ | △ | △ | △ |
| N1—P | △ | △ | △ | △ | △ | △ | △ |
| S48C (CH processed) | △ | △ | △ | △ | △ | △ | △ |
| Alumina | △ | △ | △ | △ | △ | △ | △ |
| Al | X | X | X | X | X | X | X |

In TABLE 1
⊚: excellent
○: good
△: ordinary
X: bad

The evaluations of ⊚ -X were performed on a total base according to the following criteria relative to the amount of abrasion and coefficient of friction.

| Amount of abrasion | ⊚: not more than 5 μm |
| | ○ : not more than 10 μm |
| Coefficient of friction | ⊚: not less than 0.5 |
| | ○: not less than 0.3 |

From the results of Table 1, it is apparent that vibrators which have 98-80 vol % nickel-phosphorus annealed films containing 2-20 vol % of silicon carbide, boron carbide, titanium boride or boron nitride as a single material (or as a mixed material) as a material constituting the friction surface of the vibration wave motor are excellent in their abrasion resistance relative to a material subjected to a hard alumite processing (see marks in Table 1).

Table 2 shows the results of friction tests of vibration wave motors when the vibrators 2 were configured using Ni-P films (50 μm thick) of No. 1-No. 4 (abbreviations of compositions in Table 2 are identical as those in Table 1), and the movable bodies were configured using a material subjected to a hard alumite processing.

TABLE 2

| | Hard alumite material | (Movable body) (Vibrator) | | | |
|---|---|---|---|---|---|
| | | No. 1 | No. 2 | No. 3 | No. 4 |
| Composition | Al$_2$O$_3$ | SiC—Ni—P (15%)(AN) | B$_4$C—Ni—P (15%)(AN) | TiB$_2$—Ni—P (15%)(AN) | BN—Ni—P (15%)(AN) |
| Method of formation | Anodic oxidation processing on A2218 material | Coated on a matrix material (4-6 brass) | | | |
| Coefficient of friction | | $\mu \approx 0.7$ | | | |
| Amount of abrasion | 0.5 mg | 0.4 mg | 0.4 mg | 0.5 mg | 0.5 mg |

In Table 2, A2218 is an aluminum alloy formulated according to Japanese Industrial Standard (JIS) A2218. The identical result may be obtained using A5056 aluminum alloy material or pure aluminum instead of JIS Standard A2218.

As is apparent from the results of Table 2, the test pieces No. 1–No. 4 have coefficient of friction as large as 0.7, and extremely small amounts of abrasion. For the purpose of comparison, friction tests were performed for 4–6 brass and aluminum alloy material (A2218) which are the matrix materials under the identical conditions. The results were that the coefficients of friction were only about 0.3 and the amounts of abrasion reached even as high as several hundreds times.

As described above, excellent materials constituting the friction surfaces of the vibration wave motor comprise combinations of a SiC—, $B_4C$—, $TiB_2$— or BN-system electroless Ni alloy with a hard alumite.

The production of the vibrator by a single body of an ultrahard alloy is mostly accompanied with a difficulty in processing and a high production cost. In order to solve such problems, therefore, it is preferable to provide a composite body in which, for example, the vibrator is formed by a metal which propagates elastic waves easily, such as brass, coated with a layer of SiC—, $B_4C$—, $TiB_2$—, or BN-system electroless Ni alloy on a surface of the metal matrix material. The performance of the vibrator made of the composite body was entirely identical as that of the vibrator made of a single body of an ultrahard alloy.

The thickness of the layer or film of the contacting portion of the above-described composite body is preferably 1–500 $\mu$m, and 1–50 $\mu$m for obtaining the best result.

As described above, in the present invention, since a SiC—, $B_4C$—, $TiB_2$, or BN-system electroless Ni alloy and a material subjected to a hard alumite processing are used as constituent materials for the movable body and vibrator, it is possible to obtain a vibration wave motor which has a large driving force, a small amount of abrasion and a long life.

Although a rotating-type vibration wave motor is used in the above-described embodiments, the identical effect may also be obtained even if a linear-driving-type vibration wave motor is used in the present invention. The identical effect may also be obtained not only when the present invention is applied to a vibration wave motor as in the above-described embodiments in which the movable body is driven by a traveling vibration wave, but also when it is applied to a motor in which the movable body is driven by vibration of a torsional vibrator, and the like.

Moreover, the identical effect may also be obtained even when the present invention is applied to a vibration wave motor in which the vibrator 2 with the electromechanical energy conversion element 1 fixed thereon is moved on the body 3 by a vibration wave.

What is claimed is:

1. In a vibration wave motor having a vibrator and a movable body, a friction surface of the movable body being in contact with a friction surface of the vibrator, the movable body being driven by a traveling vibration wave produced by an electromechanical energy conversion element fixed on the vibrator, wherein the improvement comprises:
   the friction surface of one of the vibrator and the movable body being a hard alumite-processed materials; and
   the friction surface of the other of the vibrator and the movable body being an ultrahard material consisting of a nickel-phosphorus-base alloy which contains a material selected from the group consisting of silicon carbide, boron carbide, titanium boride and boron nitride.

2. In a vibration wave motor according to claim 1, wherein the content of said material selected from the group consisting of silicon carbide, boron carbide, titanium boride and boron nitride is 2–20 vol %.

3. In a vibration wave motor according to claim 2, wherein said ultrahard material is formed on the vibrator in the form of a film.

4. In a vibration wave motor according to claim 3, wherein said hard alumite-processed material is a material in which aluminum or an aluminum alloy has been processed by anodic oxidation.

5. In a vibration wave motor according to claim 1, wherein said ultrahard material is formed on the vibrator in the form of a film.

6. In a vibration wave motor according to claim 5, wherein said hard alumite-processed material is a material in which aluminum or an aluminum alloy has been processed by anodic oxidation.

7. In a vibration wave motor according to claim 1, wherein said hard alumite-processed material is a material in which aluminum or an aluminum alloy has been processed by anodic oxidation.

8. In a vibration wave motor according to claim 1, 2, 3, 4, 5, 6 or 7, wherein said hard alumite-processed material has a Vickers hardness not less than 250 Hv.

9. In a vibration wave motor according to claim 8, wherein said hard alumite-processed material has a Vickers hardness not less than 350 Hv.

10. A vibration wave motor comprising:
    a vibrator having a friction surface;
    a frictional member having a friction surface in contact with the friction surface of said vibrator; and
    an electromechanical energy conversion element fixed to said vibrator for producing a traveling vibration wave in said vibrator, thereby to cause relative movement between said vibrator and said frictional member;
    the friction surface of one of said vibrator and said frictional member being a hard alumite-processed material; and
    the friction surface of the other of said vibrator and said frictional member being an ultrahard material consisting of a nickel-phosphorus-base alloy which contains a material selected from the group consisting of silicon carbide, boron carbide, titanium boride and boron nitride.

11. A vibration wave motor according to claim 10, wherein the content of said material selected from the group consisting of silicon carbide, boron carbide, titanium boride and boron nitride is 2–20 vol %.

12. A vibration wave motor according to claim 11, wherein said ultrahard material is formed on the vibrator in the form of a film.

13. A vibration wave motor according to claim 12, wherein said hard alumite-processed material is a material in which aluminum or an aluminum alloy has been processed by anodic oxidation.

14. A vibration wave motor according to claim 10, wherein said ultrahard material is formed on the vibrator in the form of a film.

15. A vibration wave motor according to claim 14, wherein said hard alumite-processed material is a material in which aluminum or an aluminum alloy has been processed by anodic oxidation.

16. A vibration wave motor according to claim 10, wherein said hard alumite-processed material is a material in which aluminum or an aluminum alloy has been processed by anodic oxidation.

17. A vibration wave motor according to claim 10, 11, 12, 13, 14, 15 or 16, wherein said hard alumite-processed material has a Vickers hardness not less than 250 Hv.

18. A vibration wave motor according to claim 17, wherein said hard alumite-processed material has a Vickers hardness not less than 350 Hv.

* * * * *

UNITED STATES PATENT AND TRADEMARK OFFICE
CERTIFICATE OF CORRECTION

PATENT NO. : 4,926,085

DATED : May 15, 1990

INVENTOR(S) : IPPEI SAWAYAMA ET AL.

It is certified that error appears in the above-identified patent and that said Letters Patent is hereby corrected as shown below:

COLUMN 1

Line 11, "wave, such" should read --wave. Such--.
    Line 39, "Ac" should read --AC--.

COLUMN 2

Line 39, "in" should read --to--.

COLUMN 4

Line 40, "movable 3" should read --movable body 3--.

COLUMN 5

Table 1, "$\frac{Bs + CH}{O}$ should read $--\frac{Bs + CH}{O}$
    X "          X --;

"Rubber-system  △ △ △ △ △ △ △
brake material    ◉ ◉ ◉ ◉ ◉ ◉
Al/Hard alumite  △                    "

should read

--Rubber-system  △ △ △ △ △ △ △
brake material
Al/Hard alumite  △ ◉ ◉ ◉ ◉ ◉ ◉-- and "Nl-P" should read --Ni-P--.

UNITED STATES PATENT AND TRADEMARK OFFICE
CERTIFICATE OF CORRECTION

PATENT NO. : 4,926,085

DATED : May 15, 1990

INVENTOR(S) : IPPEI SAWAYAMA ET AL.

It is certified that error appears in the above-identified patent and that said Letters Patent is hereby corrected as shown below:

COLUMN 6

Line 13, "    marks" should read -- Ⓢmarks--.

COLUMN 7

Line 2, "have" should read --have a--.
Line 64, "terials" should read --terial;--.

Signed and Sealed this

First Day of September, 1992

Attest:

DOUGLAS B. COMER

Attesting Officer

Acting Commissioner of Patents and Trademarks